United States Patent [19]
Abraham

[11] Patent Number: 4,889,002
[45] Date of Patent: Dec. 26, 1989

[54] ANTI-LOCKUP DRIVE MECHANISM FOR A POSITION CONTROLLED LINEAR ACTUATOR

[75] Inventor: William F. Abraham, Lancaster, N.Y.

[73] Assignee: Brunswick Valve & Control, Inc., Houston, Tex.

[21] Appl. No.: 180,161

[22] Filed: Apr. 11, 1988

Related U.S. Application Data

[63] Continuation of Ser. No. 902,424, Aug. 28, 1986, abandoned, which is a continuation-in-part of Ser. No. 733,633, May 13, 1985, Pat. No. 4,712,441.

[51] Int. Cl.⁴ .............................................. F16D 3/10
[52] U.S. Cl. ..................................... 74/89.15; 74/411; 310/78; 464/160
[58] Field of Search ...................... 74/89.15, 405, 411, 74/421 A, 440; 464/160; 310/41, 78, 79

[56] References Cited

U.S. PATENT DOCUMENTS

| 214,701 | 4/1879 | Pruyn | 464/160 |
| 232,375 | 9/1880 | Spindler et al. | 464/160 |
| 1,557,525 | 10/1925 | Hanson | 464/160 |
| 2,441,505 | 5/1948 | Ochtman | 74/424.8 R |
| 2,920,502 | 1/1960 | Bungart | 464/160 |
| 3,347,451 | 10/1967 | Vind | 464/160 |
| 4,137,784 | 2/1979 | Griffin | 74/89.15 |
| 4,661,085 | 4/1987 | Carli | 464/160 |

FOREIGN PATENT DOCUMENTS 56-134630  10/1981  Japan ................................ 464/160

Primary Examiner—Rodney H. Bonck
Assistant Examiner—Scott Anchell
Attorney, Agent, or Firm—Lowe, Price, LeBlanc, Becker & Shur

[57] ABSTRACT

A linear actuator is provided with an electric motor rotating a drive pinion gear in mesh with an intermediate gearing arrangement which in turn is in mesh with a main drive gear for rotating a drive screw journalled within a main body housing. Rotation of the drive screw causes longitudinal advancement of a drive nut axially advancing an extension rod bearing to move an output load connected to an opposite end of the extension rod. The intermediate gearing arrangement includes a lost motion mechanism allowing the drive pinion to complete approximately one revolution before imparting rotative torque to the drive screw allowing the drive motor to develop an operating torque to prevent lockup of the actuator. The lost motion mechanism includes a pair of arcuate slots formed in a first intermediate gear in contact with the drive pinion and a pair of dowel projections projecting from a second intermediate gear into the slots. The second intermediate gear is connected to the drive screw. Upon actuation of the drive motor, the first intermediate gear rotates through a predetermined angular interval unit the dowel projections move from one extreme position in the associated slot to the opposite extreme position at which time an abrupt force is imparted to the second intermediate gear to rotate the drive screw.

12 Claims, 2 Drawing Sheets

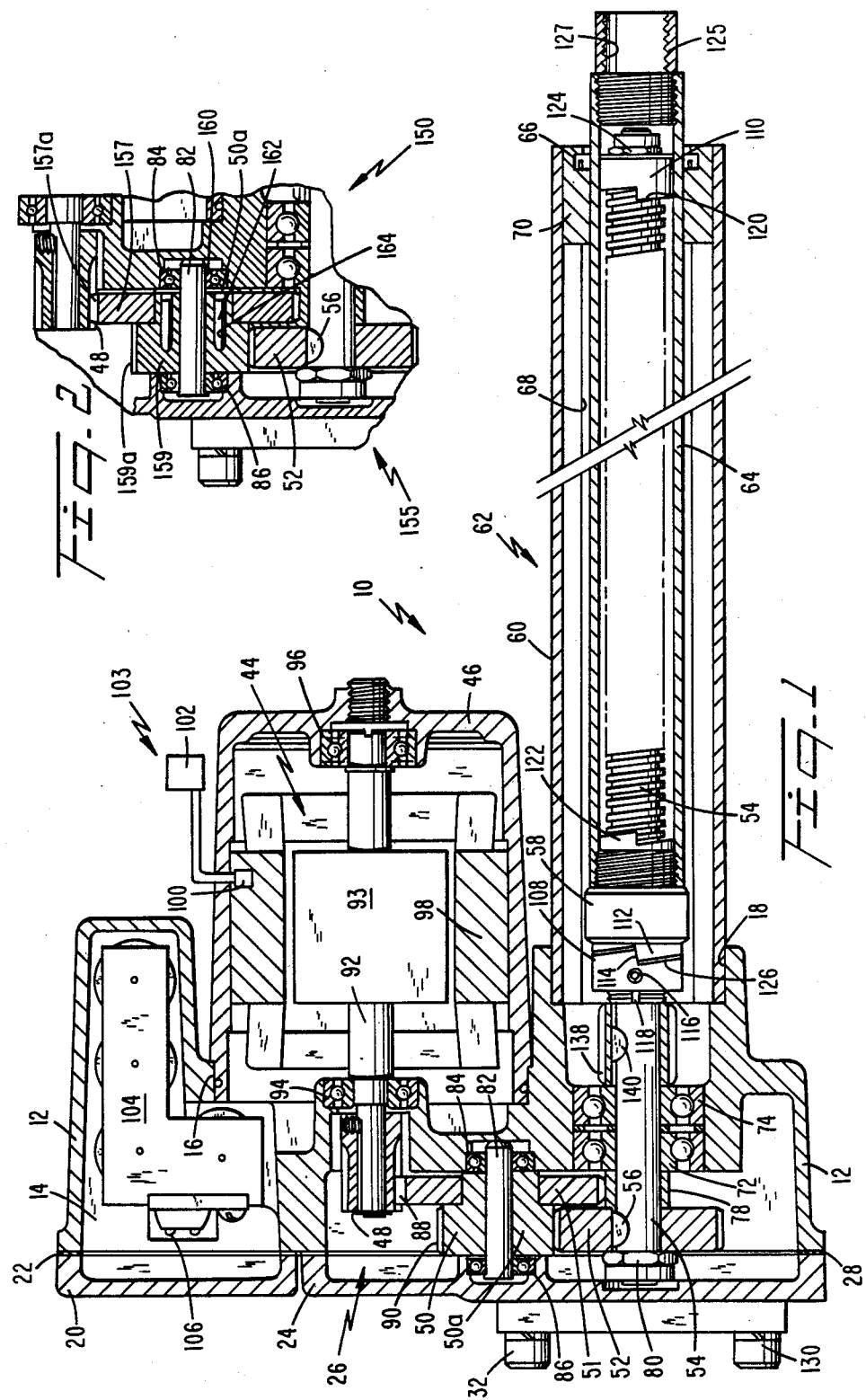

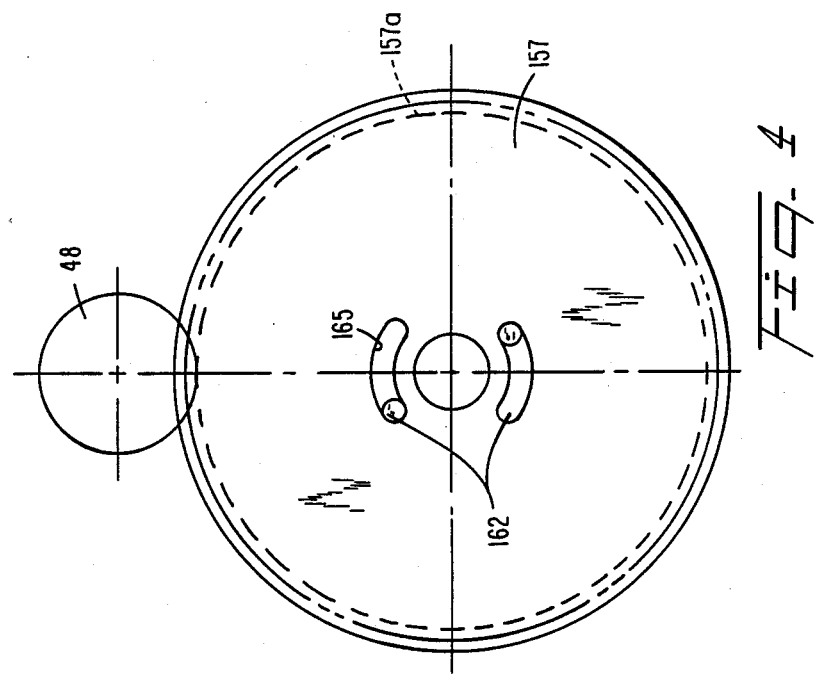
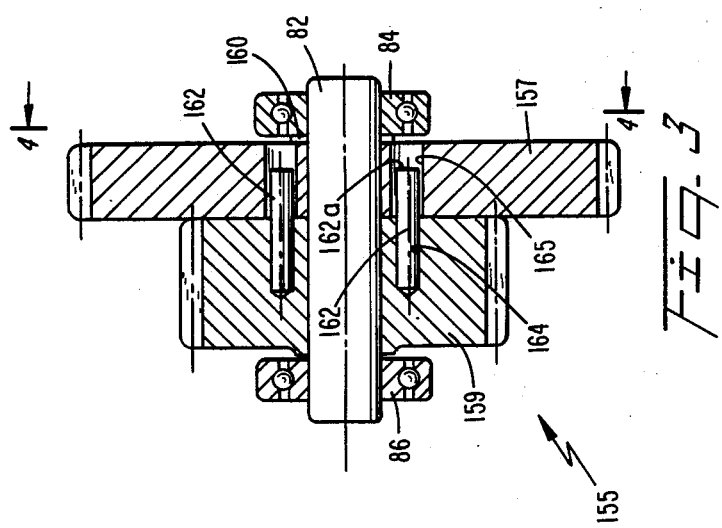

ANTI-LOCKUP DRIVE MECHANISM FOR A POSITION CONTROLLED LINEAR ACTUATOR

Related Applications

This is a continuation of application Ser. No. 902,424, now abandoned, filed Aug. 28, 1986, which is a continuation-in-part application of application Ser. No. 733,633 filed May 13, 1985, now U.S. Pat. No. 4,712,441 issued Dec. 15, 1987.

BACKGROUND OF THE INVENTION

The present invention relates to a linear actuator which is provided with a first level of position control and a second level of position and overload control and, more particularly, to an improved drive mechanism having an anti-lockup feature for transferring rotary force from an electric motor to axially move a connected extension rod of the linear actuator to move a load.

Linear actuators are typically utilized in situations where a thrust force is used for applying linear motion. Examples of the utilization of such thrust force is in the operation of lever arms, cranks, slides and valve levers in industrial equipment. Such actuators are utilized for alternately moving objects between predetermined positional limits. The actuators can be utilized for moving the movable member between positions within such predetermined limits by the utilization of appropriate feedback means.

FIG. 1 is a cross-sectional view of a preferred embodiment of the linear actuator described in my above-identified copending U.S. patent application, wherein the linear actuator 10 includes a body housing 12 formed with an upper compartment 14, an intermediate motor casing opening 16, and a body tube opening 18 at the lower end thereof. The upper compartment 14 is closed by a cover plate 20 which is sealed to the body housing 12 by a cover gasket 22. A gear compartment face plate 24 is provided for sealing the drive gear mechanism 26 within the body housing 12. A face plate gasket 28 is provided for this purpose. Suitable socket head screws are provided to secure the cover plate 20 and face plate 24 to the body housing 12.

The internal operation of the linear actuator 10 is shown in FIG. 1, wherein electric drive motor 44 which is retained within motor casing 46 provides rotary power to a drive pinion gear 48 which in turn transmits power through an intermediate gear 50 to the main drive gear 52 which is journalled to the end of the drive screw 54 by a Woodruff key 56. Rotation of drive screw 54 moves the drive nut 58 axially within the body tube 60. The body tube assembly 62 is formed by the external body tube 60 which is fitted into opening 18 and housing 12, the internal drive screw 54, the drive nut 58 and an extension rod 64 affixed to the outer side of drive nut 50 so as to extend beyond the end cap 70 of the body tube assembly 62. The drive nut 58 is secured against rotation by reaction surfaces such as described in my copending application which are formed internally within body tube 60. Drive nut 58 may be a square-sided nut as disclosed in my copending application and drive screw 54 is shown coaxially centered within the extension rod 64.

Extension rod 64 is thus axially extendible beyond the end cap 70 of the body tube assembly 62. This extension rod 64 is secured at the outer end of the body tube assembly 62 by an end cap 70 which is formed from a non-ferrous metal which then acts as a bushing and a seal.

The driven end of drive screw 54 is supported by a pair of angular contact bearings 72 and 74 which are supported within a bearing opening within body housing 12. A main gear spacer 78 is provided between the main drive gear 52 and the two bearings 72 and 74. The main drive gear is secured to the end of the drive screw 54 by a flex nut 80. The intermediate gear 50 is retained on a dowel pin 82 which is journalled between bearings 84 and 86. This intermediate gear 50 has an outer teeth set 88 for contacting the drive pinion gear 48 and an inner set 90 for contact with the main drive gear 52.

The motor drive shaft 92 connected to a rotor core 93 is supported by a front bearing 94 within body housing 12 and at the outer end by a bearing 96 which is retained in the motor casing 46. The motor stator 98 is secured within motor casing 46 and is provided with a thermal sensing element 100 which together with the switch 102 forms an overload controller means 103 shown schematically. The thermal sensing element 100 can indirectly control the switch 102 as shown. Also, the thermal sensing element 100 and switch 102 can preferably be combined into a single bi-metallic switch such as disclosed in U.S. Pat. No. 3,219,856 to Dunwiddie.

Motor casing 44 is sealed within opening 16 and housing 12 by an O-ring.

A capacitor sub-assembly 104 is provided within compartment 14 in order to provide for change of phase between the windings in motor 44 to effect the instant reversal of direction of rotation. Motor 44 is preferably a single phase motor and is connected to the capacitor sub-assembly by a connection terminal 106 as shown. The drive pinion gear, intermediate gear and the main gear then comprise the drive means of the linear actuator.

During operation of the axial movement of extension rod 64 between the terminal stroke limits, the electric drive motor 44 is utilized to provide rotational power through the drive gear mechanism 26 so that rotational power is delivered to drive screw 54. A limit switch assembly (not shown) described in detail in my copending application can be set so that power to the electric drive motor 44 is interrupted just prior to the drive nut 58 reaching either of the two terminal positions which limit its stroke. In the event that the limit switches fail, the drive nut 58 will come into contact with either the back stop 108 or the front stop 110. Mating back stop reaction shoulder portion 112 is provided on drive nut 58 to provide a complementary abutment to the reaction shoulder 114 on the back stop 108. Back stop 108 is secured to the inner end of drive screw 54 by a set screw 116 which rests in a mounting slot 118. A similar reaction shoulder 120 is provided for front stop 110 for co-action with a mating reaction shoulder portion 122 secured to the front face of drive nut 58. Both the back stop 108 and the front stop 110 are secured to and rotate with the drive screw 54. A retaining flex nut 124 is provided for retaining front stop 110.

The abutment shoulders 114 and 120 and the shoulder portions 112 and 122 on the drive nut 58 thus function to restrain the movement of drive nut 58 relative to drive screw 54 so that the actuator stroke mechanism which is provided by the body tube assembly 62 is not jammed at the ends of the extension rod stroke when the power to the drive motor 44 has not been interrupted by the limit switch assembly. In such an event, as illustrated in FIG. 1, the drive nut 58 will come into abutment contact with the back stop 108 with a safety gap 126 remaining between the abutment shoulder extension 112 and the back stop 108. Continued operation of drive motor 44 will cause the stator coils 98 to heat up beyond the predetermined temperature which is sensed by the thermal element 100. The overload controller means 103 then operates to disengage the electric power supply to motor 44.

In the event that the extension rod 64 is prevented from movement during the axial movement of drive nut 58, this same overheating of the motor stator winding will occur which will then result in the electric power being interrupted from the drive motor 44. Thus, the overload control means 103 functions both at the terminal limits of the axial movement of extension rod 64 as well as within those limits in the event of an overload thrust condition.

The extension rod 64 is fitted with a load connector 125 which has internal threads 127 for connecting with the load (not shown). A clevis bracket 128 (not shown in FIG. 1) on the opposite end of the linear actuator provides a pivotal connection to a reaction support surface. The clevis bracket is secured to the gear compartment face plate 24 by socket head cap screws 130 and 132 which are balanced by a corresponding cap screw pair (not shown).

Linear actuators such as the type described above usually include the electric motor which is connected to the drive screw through a drive means which utilizes either a gear train or a drive belt. In the case of a drive mechanism in the form of a gear train, and with reference to my actuator described above, the drive pinion gear 48 is mounted upon an output shaft of drive motor 44. The intermediate gear 50 which includes a larger diameter gear 51 press-fitted onto a hub portion 50a thereof includes the outer teeth set 88 in direct mesh with drive pinion gear 48. In turn, the teeth of intermediate gear 50 are in direct mesh with main drive gear 52 for imparting axial movement to drive nut 58 and thereby extension rod 64.

One problem present in my aforesaid linear actuator and in other linear actuators having a drive mechanism in the form of a gear train is that upon initially actuating the drive motor 44 to longitudinally advance the drive nut 58 through the gear train 48,50,52 there is a tendency for the drive mechanism to "lockup" since the motor drive shaft 92 has not attained a speed approaching operating speed and therefore may not have developed sufficient torque to overcome the inertia of the driven system, i.e., the gear train 48,50,52, drive screw 54, drive nut 58, extension rod 64 and an output load, if any, connected to and driven by the linear actuator. Frequently, "lockup" occurs when the linear actuator connected to an output load (e.g., a hopper containing fine material) is idle for any length of time. Lockup may also occur in the event that operation of the linear actuator stops at a time when the drive nut is at an extreme end of stroke position under which the drive nut tends to wedge with respect to the drive screw 54. Obviously, one disadvantage of the lockup is the inability of the linear actuator to perform its intended function resulting in down time and loss of production until the problem has been corrected.

SUMMARY OF THE INVENTION

It is accordingly one object of the present invention to provide a linear actuator with a combination of improved features which include an anti-lockup mechanism in the drive gear train providing a limited amount of lost motion in the gear train to enable the drive motor to approach and possibly attain full speed. As a result, the inertia of the drive motor rotor produces an impact or a "hammer blow" effect to the gear train overcoming the tendency of the drive mechanism or driven part of the system to lockup.

Another object of the invention is to provide a linear actuator with an anti-lockup gear train easily incorporated into the linear actuator of my prior design and with the addition of only a minimal number of parts and which anti-lockup feature is independently functional of the other improvement features of my prior design such as the features of a first level of positional control and a second level of position and overload control in my prior design.

Still another object is to provide an anti-lockup feature capable of use in other types of linear actuators incorporating a drive mechanism having a gear train to prevent overheating of the electric motor and motor windings thereof above a predetermined temperature which may result during jamming or lockup of the actuator stroke mechanism.

Yet another object is to provide an anti-lockup feature capable of reliable operation in rugged and hostile environments.

The above-noted objectives are achieved by construction of a linear actuator in accordance with the present invention. The actuator is formed with a compact body housing which provides for the acceptance of an electric motor housing and a body tube assembly within which the drive screw and drive nut are contained. The axes of the electric motor and the drive screw are arranged in parallel on the same side of the body housing. In order to utilize a low cost single phase reversible motor, a capacitor sub-assembly and housing therefore may also be provided in an inter-fitting relationship with the main actuator body housing.

The rotor of the electric motor rotates a drive pinion gear which meshes with an intermediate speed reduction gear which in turn is in mesh with a main drive gear which is keyed to one end of the drive screw. The drive screw is journalled within the main body housing by a pair of angular contact bearings and at the outer end of the body tube assembly by a non-ferrous screw guide bearing. Rotational motion from the electric motor is transmitted through the drive pinion gear, intermediate gear and the main gear to the drive screw. The drive pinion gear, intermediate gear and the main gear then comprise the drive means of the linear actuator.

In accordance with the present invention, the anti-lockup feature comprises a pair of intermediate gears mounted on a dowel pin supported in bearings. A first intermediate gear in mesh with the drive pinion gear includes at least one arcuate slot in which is received a dowel pin having one end tightly fitted within a hole formed in the second intermediate gear. The second intermediate gear includes teeth in mesh with the main drive gear. Upon initial actuation of the drive motor, the first intermediate gear is rotated by the drive pinion gear through an angular interval during which time the dowel pin travels through the slot without imparting driving movement to the second intermediate gear in mesh with the main drive gear. This arrangement allows the motor drive shaft to develop an output speed approaching operating speed. As the rotor output shaft approaches the operating speed, the dowel pin of the second intermediate gear engages the opposite end of the arcuate slot in the rotating first intermediate gear imparting a sudden torque to the second intermediate gear transmitted to the output load through the main drive gear, drive screw, drive nut and extension rod. The lost motion between the first and second intermediate gears thus enables the drive motor to reach a speed approaching full operating speed to produce an impact "hammer blow" transmitted to the main drive gear through the second intermediate gear to ensure reliable start-up of the linear actuator with or without an output load.

Preferably, a pair of arcuate slots are formed in the first intermediate gear in diametrically opposing position on opposite sides of the support dowel pin carrying the first and second intermediate gears. The angular extent of each slot is to some degree dependent on the gear ratio between the first intermediate gear and the drive pinion in mesh therewith. In the preferred embodiment, such gear ratio is approximately 4:1 in which case each slot subtends an angular interval of approximately 90 degrees. Thus, the motor output shaft and drive pinion thereon completes one full revolution before the first intermediate gear actuates the second intermediate gear and during which time the output shaft approaches full speed operation.

These and other objects of the present invention will become apparent from a description of the following drawings.

BRIEF DESCRIPTION OF THE DRAWINGS

FIG. 1 is a cross-sectional view of the preferred embodiment of the linear actuator according to my prior design set forth in my copending patent U.S. patent application;

FIG. 2 is a partial cross-sectional view of the anti-lockup drive mechanism according to the present invention when employed in the linear actuator of FIG. 1;

FIG. 3 is an enlarged cross-sectional view of the anti-lockup feature of FIG. 2 removed from the linear actuator; and FIG. 4 is an end view taken along the line 4—4 of FIG. 3 depicting the lost motion mechanism in the intermediate gear anti-lockup assembly.

DESCRIPTION OF THE PREFERRED EMBODIMENT

FIG. 2 is a partial cross-sectional illustration of linear actuator 150 incorporating the anti-lockup feature of the present invention. Linear actuator 150, apart from the improved anti-lockup intermediate gear train assembly 155 of my new design, otherwise corresponds to linear actuator 10 (FIG. 1) disclosed in my prior copending patent application. Identical reference numerals are employed in FIGS. 1 and 2 to denote elements common to both embodiments.

Anti-lockup gear train assembly 155 comprises a first intermediate gear 157 and a second intermediate gear 159 mounted on dowel pin 82 journalled between bearing 84 and 86. The first intermediate gear 157 is spaced from bearing 84 with spacer 160 and has gear teeth 157a for contacting the drive pinion gear 48. The second intermediate gear 159 has gear teeth 159a for contact with the main drive gear 52. A pair of dowel pins 162 are press-fitted or otherwise fixed within blind holes 164 formed parallel to each other within second gear 159 on opposite sides of dowel pin 82. The free ends 162a of dowel pins 162 project from the right-hand side (FIG. 3) of second gear 159 generally perpendicular to the plane of the second gear where they are respectively received with arcuate slots 165 formed in first gear 157 in diametrically opposing relation about dowel pin 82. The diameters of dowel pins 162 at free ends 162a thereof is slightly less than the radial width of each slot 165 to provide a loose fit therewith. The dowel pins 162 are further dimensioned so that free ends 162a project well within the slots (i.e., preferably at least half the thickness of the slot as measured between the parallel end faces of gear 157) without projecting outwardly from the slots towards bearing 84.

Upon actuating drive motor 44 to operate linear actuator 150, the motive force transmitted through output shaft 92 drives pinion 48 to impart rotational movement to first intermediate gear 157. Initially, the first intermediate gear 157 is in the position generally depicted in FIG. 4 with dowel pins 162 positioned more or less against diametrically opposed ends of slots 165. However, rotation of gear 157 in the counter clockwise direction of FIG. 4 causes the dowel pins 162 to travel through the slots by virtue of the rotary movement of the slots formed in the first intermediate gear. During this interval, it will be appreciated that drive motor 44 is only powering drive pinion 48 and the intermediate gear 157 and therefore encounters minimal inertia as the motor output shaft rotates to operating speed at which time dowel pins 162 abut against the opposite diametrically opposed ends of arcuate slots 165. When this occurs, drive motor 44 has developed sufficient torque to abruptly transmit motive force to second intermediate gear 159 powering main drive gear 52, drive screw 54, drive nut 58 and extension rod 64 to overcome the inertial resistance of these driven parts to drive the output load. In this manner, the lost motion arrangement provided by arcuate slots 165 and dowel pins 162 in gears 157,159 respectively allow drive motor 44 to develop operating torque to reliably operate linear actuator 150 by eliminating the tendency of the driven parts to lockup with or without an output load connected thereto.

The angular extent of each slot 165 in the circumferential direction of gear 157 is somewhat dependent upon the gear ratio between drive pinion 48 and first intermediate gear 157. To explain, it requires approximately one revolution of output shaft 92 and thereby drive pinion 48 (plus or minus 25%) for the output shaft to reach operating speed and thereby develop sufficient anti-lockup torque. Therefore, it is preferable to design the arcuate interval of each sot 165 so that drive pinion 48 completes one revolution before dowel pins 162 travel from one end of their associated slot to the opposite end. In one commercial embodiment of linear actuator 150, the gear ratio is preferably about 1:4, meaning that slots 165 should be formed to subtend an angular interval of approximately 90 degrees for each slot. In the event the gear ratio changes as between different commercial embodiments of linear actuator 150, it is preferable to design slots 165 in the manner described above so that pinion 48 completes one revolution before dowel pins 162 travel from one end of their associated slot to the opposite end.

It will be appreciated that the force impact acting upon second intermediate gear 159 as dowels 162 reach the opposite end of their associated slots 165 is to some degree dependent upon the radial position of the slots relative to the central longitudinal axis of dowel pin 82 upon which gears 157,159 are mounted. In other words, by locating slots 165 at a greater radial distance from dowel pin 82, the force or "hammer blow" impact transmitted from gear 157 to the gear 159 is greater than if slots 165 were located closer to dowel pin 82. In other words, by locating the slots 165 at a greater radial location than that disclosed in FIG. 4, it would not be necessary for slots 165 to have an arcuate extent dependent upon the gear ratio; i.e., the same impact force obtained with the arrangement of slots depicted in FIG. 4 can also be obtained by locating the slots at a radially greater position than the FIG. 4 location and, if desired, forming the slots to have an arcuate extent less than 90 degrees. In commercial practice of linear actuator 150, however, it is often difficult to relocate slots 165 from the FIG. 4 position due to the smaller diameter of second intermediate gear 159 which typically may have a root diameter of 0.8 inches (one inch outside diameter) whereas dowel pin 82 has a typical diameter of ⅜ inches. It is preferred, however, to maintain slots 165 and thereby dowel pins 162 midway between the outer periphery of dowel pin 82 and the root diameter of second intermediate gear 159.

Although the present invention may be practiced with only one slot 165 receiving free end 162a of one dowel pin 162, the provision of two slots is preferred to provide better force distribution to prevent shearing of the dowel pins 162.

The invention may be embodied in other specific forms without departing from the spirit or essential characteristics thereof. For example, it is possible to form arcuate slots 165 in second intermediate gear 159 and to press fit dowels 162 into holes formed in first gear 157 with free ends 162a projecting into the second gear. The present embodiments are therefore to be considered in all respects as illustrative and not as restrictive, the scope of the invention being indicated by the appended claims rather than by the foregoing description, and all changes which come within the meaning and range of equivalency of the claims are therefore intended to be embraced therein.

What is claimed is:

1. A linear actuator comprising:
a housing;
a drive screw rotatably supported within said housing;
a drive nut in threaded engagement with said drive screw;
a body tube assembly connected to said housing and positioned about said drive screw, said body tube assembly containing reaction force surfaces for preventing rotation of said drive nut;
an extendible member having a load connecting member on its free end and having the opposite end thereof connected to a drive nut, said extendible member adapted for axial movement so as to extend out of said body tube;
drive means including an electric drive motor containing windings for rotating said drive screw; said drive means including intermediate gearing means for transmitting rotative torque output from said electric drive motor to rotate said drive screw, said intermediate gearing means including a lost motion arrangement means for delaying rotation of said drive screw for a predetermined interval during which a drive pinion of said electric drive motor rotates through a predetermined angular interval, said lost motion arrangement means enabling said drive pinion to attain a rotational speed approaching a predetermined operating speed before imparting rotative torque to drive said drive screw through the intermediate gearing means, said lost motion arrangement preventing lockup of the electric motor and over-heating of the motor windings tending to occur when an output load is connected to the load connecting member, wherein said intermediate gearing means includes a first intermediate gear and a second intermediate gear both mounted intermediate the electric motor and the drive screw, said first intermediate gear in contact with a drive pinion and said second intermediate gear connected to transmit rotative force to the drive screw, said lost motion arrangement means being formed between said first and second intermediate gears to enable initial rotation of said first intermediate gear under the driving force of the drive pinion before imparting rotative force to the second intermediate gear and thereby the drive screw.

2. The linear actuator of claim 1, wherein said lost motion arrangement means includes at least one arcuate slot formed in one of the first and second intermediate gears and a dowel projection received in the other of said first and second intermediate gears and having a free end extending into the slot, whereby rotation of said first intermediate gear under the driving force of the drive pinion causes the dowel projection to travel through the slot before contacting the opposite end of the slot for imparting a sudden rotative force to the second intermediate gear and thereby the drive screw.

3. The linear actuator of claim 2, further including a pair of arcuate slots formed in diametrically opposing location to each other on opposite sides of the dowel pin, a dowel projection being received in each slot.

4. The linear actuator of claim 3, wherein each arcuate slot subtends an angular interval approximately equal to the gear ratio of the drive pinion to the first intermediate gear multiplied by 360 degrees.

5. The linear actuator of claim 3, wherein the arcuate extent of each slot is sufficient to enable the drive pinion to complete approximately 0.75–1.25 revolutions before the dowel projection travels from one end of the slot to the opposite end of the slot.

6. The linear actuator of claim 3, wherein each dowel projection has a central longitudinal axis extending substantially parallel to the central axis of the second intermediate gear, the longitudinal axis of the dowel projection being formed approximately midway between the root diameter of the second intermediate gear and the longitudinal axis of the dowel pin supporting said first and second intermediate gears.

7. The linear actuator of claim 3, wherein said dowel projections are force-fitted into diametrically opposed blind holes formed in the second intermediate gear.

8. The linear actuator of claim 7, wherein each dowel projection projects into its associated slots at least approximately half the thickness of the first intermediate gear.

9. The linear actuator of claim 3, wherein opposite ends of each slot are rounded and have a diametrical extent slightly greater than the diameter of the associated dowel projection to prevent wedging of said dowel within said opposite ends.

10. A linear actuator comprising:
a housing;
a drive screw rotatably supported within said housing;
a drive nut in threaded engagement with said drive screw;

a body tube assembly connected to said housing and positioned about said drive screw, said body tube assembly containing reaction surfaces for preventing rotation of said drive nut;

an extendible member having a load connecting member on its free end and having the opposite end thereof connected to a drive nut, said extendible member adapted for axial movement so as to extend out of said body tube;

drive means including motor means for rotating said drive screw, said drive means including intermediate gearing means for transmitting rotative torque output from said motor means to rotate said drive screw, said intermediate gearing means including a lost motion arrangement means for delaying rotation of said drive screw for a predetermined interval during which a drive pinion means of said motor means rotates through a predetermined angular interval, said lost motion arrangement means enabling said drive pinion means to attain a rotational speed approaching a predetermined operating speed for imparting rotating torque to drive said drive screw through the intermediate gearing means, wherein said intermediate gearing means includes a first intermediate gear and a second intermediate gear both mounted intermediate the electric motor and the drive screw, said first intermediate gear in contact with a drive pinion and said second intermediate gear connected to transmit rotative force to the drive screw, said lost motion arrangement means being formed between said first and second intermediate gears to enable initial rotation of said first intermediate gear under the driving force of the drive pinion before imparting rotative force to the second intermediate gear and thereby the drive screw.

11. A linear actuator comprising:

a housing;

a drive screw rotatably supported within said housing;

a drive nut in threaded engagement with said drive screw;

a body tube assembly connected to said housing and positioned about said drive screw;

an extendible member having a load connecting member on its free end and having the opposite end thereof connected to the drive nut, said extendible member adapted for axial movement so as to extend out of said body tube;

drive means including motor means for rotating said drive screw, said drive means including intermediate gearing means for transmitting rotative torque output from said motor means to rotate said drive screw, said intermediate gearing means including a lost motion arrangement means for delaying rotation of said drive screw for a predetermined interval during which interval said motor means increases its torque output, wherein said intermediate gearing means includes a first intermediate gear and a second intermediate gear both mounted intermediate the electric motor and the drive screw, said first intermediate gear in contact with a drive pinion and said second intermediate gear connected to transmit rotative force to the drive screw, said lost motion arrangement means being formed between said first and second intermediate gears to enable initial rotation of said first intermediate gear under the driving force of the drive pinion before imparting rotative force to the second intermediate gear and thereby the drive screw.

12. An actuator comprising:

a housing;

a drive screw rotatably supported within said housing;

an extendible member having a load connecting member on its free end and having the opposite end thereof connected to the drive screw, said extendible member adapted for axial movement so as to extend out of said body tube upon rotation of the drive screw;

drive means including means for rotating said drive screw, said drive means including gearing means for transmitting rotative torque output from said motor means to rotate said drive screw, said gearing means including a lost motion arrangement means for delaying rotation of said drive screw for a predetermined interval during which interval said motor means increases its torque output, wherein said intermediate gearing means includes a first intermediate gear and a second intermediate gear both mounted intermediate the electric motor and the drive screw, said first intermediate gear in contact with a drive pinion and said second intermediate gear connected to transmit rotative force to the drive screw, said lost motion arrangement means being formed between said first and second intermediate gears to enable initial rotation of said first intermediate gear under the driving force of the drive pinion before imparting rotative force to the second intermediate gear and thereby the drive screw.

* * * * *